United States Patent

[11] 3,561,735

| [72] | Inventor | Millard F. Smith |
| | | P.O. Box 295, Westport, Conn. 06882 |
| [21] | Appl. No. | 815,665 |
| [22] | Filed | Apr. 14, 1969 |
| [45] | Patented | Feb. 9, 1971 |
| | | Continuation-in-part of application Ser. No. 734,805, June 5, 1968, now abandoned, which is a continuation-in-part of application Ser. No. 617,398, Feb. 20, 1967, now abandoned, and a continuation-in-part of Ser. No. 477,987, May 10, 1965, Patent No. 3,311,085, and a continuation-in-part of Ser. No. 513,366, Dec. 13, 1965, Patent No. 3,422,795, and a continuation-in-part of Ser. No. 110,581, May 16, 1961, abandoned. |

[54] FLUID-BELL-SHEET FORMING APPARATUS
12 Claims, 4 Drawing Figs.

[52] U.S. Cl........................................................ 261/34,
261/115, 261/126; 210/192; 239/524; 250/43; 138/37
[51] Int. Cl........................................................ B01f 3/04,
B01f 5/20; B01d 47/06
[50] Field of Search............................................ 261/115,
126, 34; 210/192, 62; 239/504, 23, 524; 138/37;
21/74; 250/43

[56] References Cited
UNITED STATES PATENTS

| 694,081 | 2/1902 | Weis et al. .................... | 261/115 |
| 737,444 | 8/1903 | Moore........................... | 261/115 |
| 942,430 | 12/1909 | Altenhofen.................... | 261/126 |
| 1,007,647 | 10/1911 | Darnall........................ | 210/62 |
| 1,207,309 | 12/1916 | McIntyre...................... | 210/192 |
| 1,420,046 | 6/1922 | MacGregore et al......... | 210/192 |
| 1,606,377 | 11/1926 | Murray......................... | 239/504 |
| 1,799,084 | 3/1931 | Brdar........................... | 261/126 |
| 2,485,267 | 10/1949 | Ellner.......................... | 250/43 |
| 2,767,025 | 10/1956 | Griffith........................ | 261/115 |
| 2,874,001 | 2/1959 | Webb........................... | 299/141 |
| 2,929,248 | 3/1960 | Sprenkle ...................... | 138/37X |
| 3,101,173 | 8/1963 | Jennings....................... | 239/23 |
| 3,141,000 | 7/1969 | Turner ......................... | 239/524X |
| 3,212,559 | 10/1965 | Williamson................... | 261/115X |
| 3,366,441 | 1/1968 | Ellner et al. .................. | 21/74 |

FOREIGN PATENTS

| 60,168 | 7/1913 | Austria......................... | 261/126 |
| 531,629 | 1/1941 | Great Britain................ | 261/126 |

Primary Examiner—Ronald R. Weaver
Attorney—Robert H. Ware

ABSTRACT: Fluid bell sheet forming apparatus incorporating a fluid delivery conduit provided with at least four flow straightening transverse screens, directing the stream of fluid issuing therefrom against a deflector positioned to spread the stream laterally, forming a thin, continuous outwardly moving sheet shaped by gravity to form a "fluid bell," to promote intermixing of the delivered fluid and the surrounding gas, or to facilitate the capture of entrained solid or liquid particles carried by the surrounding gas in the advancing bell-shaped fluid stream, or to expose the fluid stream thoroughly to incident radiation, such as sunlight or ultraviolet radiation. Extreme thinness of the continuous liquid sheet maximizes the ratio of exposed liquid surface to liquid volume, thus maximizing the effectiveness of the intermixing, entrainment and irradiation operations.

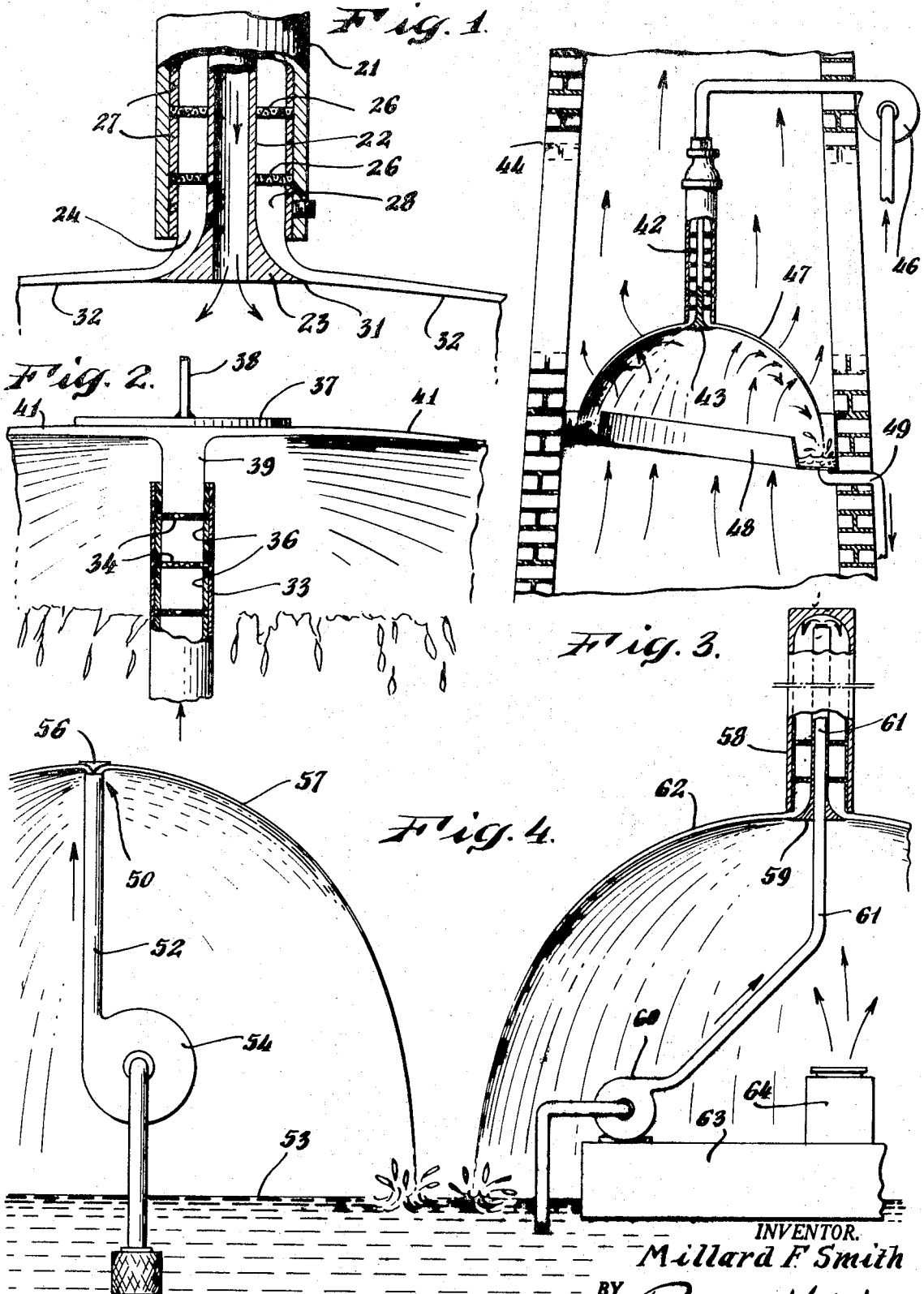

FLUID-BELL-SHEET FORMING APPARATUS

CROSS REFERENCE TO RELATED APPLICATIONS

This application is a continuation-in-part of the copending sole application of Millard F. Smith, Ser. No. 734,805 filed Jun. 5th 1968, and now abandoned which was itself a continuation-in-part of: Ser. No. 617,398, filed Feb. 20, 1967, now abandoned; Ser. No. 477,987, filed May 10, 1965, now U.S. Pat. No. 3,311,085; Ser. No. 513,366, filed Dec. 13, 1965, now U.S. Pat. No. 3,422,795; Ser. No. 110,581, filed May 16, 1961, now abandoned.

BACKGROUND OF THE INVENTION

Conventional water sprays have been used for scrubbing stack gases in order to minimize air pollution, to condense and carry away volatiles from hot gas mixtures, and for the aeration of water supply reservoirs, and for the latter purpose geyserlike water fountains have also been employed. Similar fluid scrubber sprays are employed in chemical processing apparatus to chill, condense, entrap and carry away volatile gases in a spray of solvent liquid, as shown U.S. Pat. No. 3,212,197 to Crawford. Discontinuities and nonuniformity of the thin steams or "sheets" of water produced by such geysers, fountains, scrubbers and sprays seriously reduce the effectiveness of these devices. Globules and large drops of water or solvent fluid ejected by such devices have a majority of their molecules isolated in the interiors of such drops, and not exposed to the surrounding gas, seriously minimizing the cooling, scrubbing or aerating effectiveness of such systems or their irradiation efficacy.

Accordingly, a need has long existed for a highly effective liquid gas intermixing device or aerating, scrubbing or cooling which is capable of projecting a moving stream of liquid in thin, substantially continuous sheets, for maximum exposure of the advancing steam of liquid to the surrounding gas. The devices of the present invention provide such thin, continuous sheets of advancing liquid with unexpectedly high effectiveness.

SUMMARY

The fluid sheet forming apparatus of the present invention comprises a liquid delivery conduit incorporating a series of transverse, flow straightening screens subdividing the advancing steam of fluid into a plurality of parallel substreams exhibiting substantially laminar flow characteristics, in combination with a deflector positioned at the outlet of the fluid delivery conduit and shaped to deflect the advancing fluid stream radially. As a result, the fluid stream is spread radially outward as a thin, continuous radial sheet of uniformly diminishing thickness, having substantially no discontinuities for an appreciable distance from the fluid delivery conduit. The extreme thinness of the edgewise moving sheet provides a maximum ratio of exposed liquid surface to liquid volume, thus maximizing the effectiveness of irradiation of the liquid and of its intermixing with surrounding gas.

This radially spreading thin fluid sheet will generally be redeflected by gravity. Thus, if it originally spreads from the deflector in a horizontal plane, or in a conical sheet having a vertical axis of symmetry, it will descend in a bell shape, retaining its continuity for a substantial distance before finally breaking up separate droplets and globules of fluid.

The high surface-to-volume ratio exhibited by these fluid sheets affords excellent intermixing of the fluid molecules with ambient gas molecules, promoting the dissolving of the gas in the fluid and enhancing the scrubbing, cooling, aerating and other effects of these devices.

A pressure differential created between the underside of such a fluid bell and its upper side will increase the intermixing of the gas beneath the bell with the fluid stream forming the bell, thus producing enhanced operation of such devices as water supply reservoir aerator devices incorporating the systems of the present invention. Furthermore, when used for scrubbing and purifying stack gases, soot and solid particles or liquid droplets entrained in the advancing stack gas stream approaching the underside of the fluid bell are captured and carried away by the fluid stream forming the fluid bell with unusually great effectiveness, while the gaseous constituents of the stack gas stream thereafter flow upward past the fluid bell for release into the atmosphere, largely cleansed of air pollutants including soot, fluid droplets and easily dissolved volatile gaseous pollutants originally carried by the stack gas stream.

I have discovered that at least four transverse flow straightening screens should be used. A group of six spaced transverse screens with their apertures aligned along substantially smooth uninflected streamlines in the advancing fluid stream produce the best results. As shown in my U.S. Pat. No. 3,311,085, columns 10, 11 and 12 and FIGS. 11, 18 and 19, six aligned screens eliminate back pressure and significantly enhance the rate of flow. Straight line or slightly helical alignment of these aligned screen apertures both provide good uninflected streamlines and resulting laminar flow characteristics. Straight line alignment of screen apertures is generally easier to achieve, and can be confirmed by a light beam or a fine straight wire passing through aligned screen apertures.

In the combination of the present invention, I have found that a very thin uniform continuous sheet of fluid is created by the impingement of such a laminar flow fluid stream against a deflector which diverts the stream laterally to spread it into a fluid sheet. When at least four and preferably six aligned transverse screens are used, the resulting fluid sheet achieves maximum continuity and uniform thinness. An example of six spaced apart screens with their apertures in streamline alignment are shown in conduit 42 in FIG. 3.

By means of this technique, much more even and thinner walled fluid bells can be achieved. Such a bell (produced by screens) is regenerating if disturbed by air turbulence or other interruptions.

A nonaligned plurality of screens having random warp-woof orientation are of no value in reducing turbulence. This was shown by Schubauer and Spangenberg in National Bureau of Standards (NACA) Report 949 (No. 101387), EFFECTS OF SCREENS IN WIDE-ANGLE DIFFUSERS, a wind tunnel flow investigation.

Accordingly, a principal object of the present invention is to provide a fluid sheet forming apparatus producing a thin, continuous, radially advancing fluid stream.

Another object is to provide such apparatus incorporating flow straightening devices and lateral deflectors together producing the thin, continuous, radially advancing stream of delivered fluid.

A further object is to provide such apparatus forming with the aid of gravity a "bell-shaped" concave sheet of advancing fluid.

Another object of the invention is to provide such apparatus incorporating means for introducing a pressurized gas to the underside of the bell-shaped sheet of advancing fluid.

Other and more specific objects will be apparent from the features, elements, combinations and operating procedures disclosed in the following detailed description and shown in the drawings.

THE FIGURES

FIG. 1 is a greatly enlarged, fragmentary, side elevation view, largely in section, showing the open delivery end of a fluid delivery conduit incorporating flow straightening screens and a terminal deflector in accordance with the present invention;

FIG. 2 is an enlarged, side elevation view, largely in section, showing a similar fluid delivery conduit with corresponding transverse flow straightening screens employed with an external deflector directly interposed in the advancing fluid stream as it issues from the delivery conduit;

FIG. 3 is a fragmentary side elevation view of an exhaust gas stack incorporating a scrubbing device of the present invention, and FIG. 4 is a fragmentary side elevation view, partially in section, showing two different embodiments of the invention employed for water supply aeration.

PREFERRED EMBODIMENTS

The preferred embodiments of the invention all incorporate a flow straightening fluid delivery conduit in combination with a terminal deflector employed to divert the advancing fluid stream radially to form a thin, flat radial fluid sheet. Thus, as shown in FIG. 1, a fluid delivery conduit 21, formed as a round, cylindrical pipe, is provided with a coaxial central gas supply conduit 22 extending along the length of the delivery conduit 21 and terminating in a radially flaring horn-shaped deflector 23 juxtaposed within the open delivery portal 24 of fluid delivery conduit 21.

Arrayed at intervals tansversely spanning the interior of fluid delivery conduit 21 are a plurality of transverse flow straightening elements such as etched or woven screens 26 of metal or other long lasting material such as glass or plastic. The screens 26 are preferably held at axially spaced intervals by spacing rings 27 telescopingly positioned inside fluid delivery conduit 21, and retained by a terminal spacing ring 28 positioned near the delivery portal 24 of the delivery conduit 21 and locked in its terminal position by such means as a setscrew 29.

The fluid stream advancing along delivery conduit 21 is subdivided by the screens 26 into a plurality of parallel substreams exhibiting substantially laminar flow characteristics, which may be said to include (1) substantially smooth, parallel, uninflected stream lines passing through and issuing from the arrayed plurality of transverse screens, with (2) substantially equal pressures and particle velocities at laterally contiguous points of adjacent stream lines between the spaced-apart screen means.

In the preferred systems of this invention, no trace of the separate substreams created by the aligned apertures of the plurality of screens can be observed in the fluid stream issuing from the portal end of the delivery conduit. The uninterrupted continuity of the radially edgewise advancing fluid sheet produced therefrom by the deflectors 23, 37, 43, 56 or 59 is an indication that the screens provide a unitary continuous liquid stream delivered from the open portal end of the delivery conduit.

This unitary stream is diverted radially about its entire periphery by a blocking deflector interposed facing the delivery conduit portal end. THis deflector extends transversely across the full diameter of the unitary stream; the deflector diameter is preferably at least as great as the delivery conduit portal opening diameter which it faces. Flat plate deflectors like plate 37 have been used in some cases, but the deflectors preferred in the systems OF this invention are smoothly flaring "horn-shaped" deflectors, such as deflectors 23, 43, 56 or 59, terminating in a rim 31 preferably having a radius larger than the internal diameter of the spacing rings 27 forming the internal wall surface of the fluid delivery conduit 21, as shown in FIG. 1. The deflecting surfaces of these deflectors are surfaces of revolution having a generatrix curve changing from an entrance tangent parallel to the axis of the advancing liquid stream and blending smoothly into an exit tangent directed outwardly radially, causing the streamlines of the advancing unitary liquid stream to be diverted laterally by a large angle which may be approximately a right angle. These horn-shaped deflectors are preferably positioned in the fluid stream directly in the open portal end of the delivery conduit, as shown in FIGS. 1, 3 and 4.

As shown in these FIGS. the deflectors face and block the direct linear progress of liquid streamlines issuing from the open portal ends of these delivery conduits, thereby producing the desired lateral diversion of the unitary liquid stream.

The resulting fluid stream leaving exit portal 24 and rim 31 of deflector 23 adopts a thin radial sheet configuration as shown at 32 in FIG. 1. When the sheet 32 originally extends in a substantially horizontal plane, it will be progressively deflected by gravity as indicated in FIGS. 2, 3 and 4 to form a descending bell-shaped sheet.

Thus, in the modified embodiment shown in FIG. 2, the fluid delivery conduit 33 with transverse screens 34 spaced apart by internal spacing rings 36 contains no internal structure except for the transverse screens 34 themselves. An external deflector 37 formed as a round, disc-shaped plate secured as by welding to an anchored support rod 38 is coaxially aligned to be squarely interposed in the advancing fluid stream 39 issuing from the end of the delivery conduit 33. The deflector 37 serves to divert the stream radially in much the same manner as does the deflector 23 in FIG. 1, producing a comparable thin, substantially continuous sheet 41 of progressively diminishing thickness, expanding radially outward from the coaxial center lines of support rod 38, deflector 37 and the fluid delivery conduit 33, and progressively diverted by the force of gravity to form a descending bell-shaped sheet.

The internally supported deflector assembly of FIG. 1 or the external deflector and separate fluid supply conduit of FIG. 2 may be employed alternatively, as indicated in FIGS. 3 and 4. The internal deflector 23 supported on a hollow internal gas supply conduit 22 is well adapted to introduce pressurized gas through the conduit 22 to the underside of the radially expanding sheet 32, and this configuration is useful with internally unobstructed bell sheet arrangements.

STACK GAS SCRUBBING

A highly effective stack gas scrubbing system is shown in FIG. 3. A fluid delivery conduit 42 with an internally supported deflector 43 is centrally positioned at or near the axis of a vertical exhaust gas stack 44. Fluid such as water is used for scrubbing of the exhaust gas traveling upward through gas stack 44, and this water is supplied to conduit 42 from a water supply source not shown through a pump 46, operatively connected to the conduit 42. The resulting bell-shaped sheet 47 of water travels radially outward and downward toward the internal periphery of stack 44, where a recovery through 48 is positioned to receive the arriving fluid stream around the internal periphery of the stack 44. A drain 49 positioned at a low point in the slightly skewed ring-shaped through 48 conducts the fluid collected in the trough through the wall of stack 44 to waste, to recovery or to purification systems not shown.

Stack gases traveling upward through stack 44 are thoroughly mixed into the advancing fluid sheet stream 47, and must travel through the sheet in order to continue their ascent up stack 44. In their passage through the rapidly advancing fluid stream 47, these stack gases 49 surrender substantially all of their entrained solid and liquid droplet materials and a large portion of their soluble volatile gaseous pollutants, which are chilled, condensed and absorbed by the advancing fluid stream traveling from conduit 42 to trough 48. Solid, liquid and gaseous air pollutants are thus largely removed from the stack gases passing upward through the stack 44 shown in FIG. 3.

AERATION SYSTEMS

Water supply aeration systems may employ any or all of the aeration water bell sheet forming devices illustrated in the drawings. On the left-hand side of FIG. 4 there is shown an assembly 50 generally similar to that shown in FIG. 1, inverted for upward delivery of the fluid stream, and positioned at the upper end of a fluid delivery conduit 52 supplied with water from reservoir 53 by a pump 54 operatively connecting the reservoir 53 with the fluid delivery conduit 52. Assembly 50 incorporates an internally supported deflector 56 secured by radial struts, spiders or other means to the interior of conduit 52, and producing a bell-shaped descending sheet 57 having the same uniform and substantially continuous configuration described above.

At the right-hand side of FIG. 4 there is shown a modified embodiment incorporating a fluid delivery conduit 58 having an internal deflector 59 supported on and forming a terminal, 180° reversing annular, coaxial return flow conduit surrounding a pressurized water supply conduit 61 internally and coaxially mounted within the fluid delivery conduit 58 in the manner shown in FIG. 1. Water from the reservoir 53 may be delivered by a pump 60, to the fluid supply conduit 58 by way of water supply conduit 61. As shown in FIG. 4, a float 63 may support the pump 60 and delivery conduits 61 and 58, and also a chlorine gas generator or an ozone generator 64 if desired. Compressed atmospheric air, chlorine or ozone may thus be delivered inside the sheet 62 by such means as a blower or the gas generator 64, producing a positive pressure differential between the inner and outer surfaces of the sheet 62, enchancing the intermixing of atmospheric air, chlorine or ozone with the advancing sheet 62, and resulting in the absorption of substantial quantities of gas dissolved in the water traveling along the sheet 62 from conduit 58 back to the surface of reservoir 53.

The positive pressure differential produced by gas introduced beneath the bell-shaped sheet via the central bore in conduit 22 of FIG. 1, the stack 44 of FIG. 3 or the gas generator 64 of FIG. 4 has the effect of pressurizing the bell-shaped sheet, expanding it in a bubblelike manner. This internal pressure enhances the intermixing of gas molecules into the liquid molecules on the underside of the liquid sheet.

Ozone is illustrative of one type of water purification agent which may be conveniently used with the present invention to aid its water cleansing action. Chlorinating or irradiating methods are also commonly used for the purification of water. By subjecting sheet 62 to sunlight or a source of ultraviolet light, irradiation may be achieved, and the treatment unit 64 positioned beneath the water bell 62 in FIG. 4 may be an ultraviolet radiation source exposed to the inner surface of bell 62 if desired.

In this manner, the aeration performance of the assemblies of this invention far exceeds the aeration produced by randomly delivered globules and droplets of water projected in the air by conventional "fountains," sprays or geysers, since the thin uniform advancing sheet 62 has a maximum of its surface area exposed to the atmospheric air, and an absolute minimum number of water molecules in the advancing sheet are enclosed inside the sheet without such exposure to the surrounding ambient air. In a similar manner, the thin, uniform and continuous bell-shaped sheets of water or other fluids produced by the assemblies of the present invention substantially enhance the volatile gas scrubbing, condensation and absorption, the entrainment of solid dust particles, and the capture of entrained fluid droplets from the ambient atmosphere and particularly the removal of solid, liquid and gaseous pollutants from the passing streams of stack gases approaching and passing through the bell-shaped fluid streams in the embodiment shown in FIG. 3.

In the devices of this invention, the fluid stream subdivided by the transverse screens and radially spread by the portal deflectors to produce thin advancing fluid sheets is generally either water or a scrubbing solvent capable of dissolving volatile gases. Streams of other fluids, such as gases, may be so formed if desired, and fast, thorough intermixing of such streams with the ambient gas can be produced by the delivery devices of this invention. Similarly, gas suspended streams of "fluidized" powdered solids, such as thermosetting plastic coating materials, may be delivered radially to coating zones by these devices with high precision and good volumetric rate control.

The fluid sheets 32, 41, 57 or 62 may be adapted to form fluid "closures" for doorways to dust-free clean rooms, since they will serve to entrap and carry away airborne dust particles. Such "fluid curtains" may be parted by an upstream facing knife-edged member interposed therein, which divides the advancing fluid sheet to form a V-shaped aperture therein.

The flow straightening screens 26 and 34 apparently produce substantially laminar flow by minimizing or eliminating turbulence in the fluid stream advancing therethrough, for if the deflector 23, 38, 43, 56 or 59 is omitted, the delivered fluid stream is unusually smooth flowing with little tendency to divide or spatter; such streams have the characteristics of "aerated" streams without the additional air entrained therein, making them useful in many cases where splashing and spattering must be avoided while aeration and entrained gases must be kept to a minimum.

While the objects of the invention are efficiently achieved by the preferred forms of the invention described in the foregoing specification, the invention also includes changes and variations falling within and between the definitions of the following claims.

I claim:

1. Liquid delivery apparatus comprising in combination:
   a. an elongated liquid delivery conduit having an open portal end and a supply end and having a vertical longitudinal axis, incorporating near its open portal end at least four transverse flow straightening screens spaced apart longitudinally and having their screen apertures aligned along smooth uninflected streamlines;
   b. and a deflector interposed in a unitary continuous liquid stream delivered from the open portal end of the liquid delivery conduit, said deflector being positioned directly at said open portal end, said deflector being a smoothly flaring horn-shaped solid of revolution symmetrically positioned relative to the vertical axis of the liquid delivery conduit, said deflector extending transversely across the full lateral width of the unitary liquid stream and being juxtaposed facing the full transverse cross-sectional area of the delivery conduit to obstruct direct parallel travel of the liquid streamlines issuing from the open portal end, said deflector including means diverting the delivered liquid stream laterally into a thin laterally spreading edgewise advancing down curving bell-shaped liquid sheet;
   c. a source of liquid connected by a liquid supply conduit to the supply end for delivery through the delivery conduit;
   d. a pump interposed in the liquid supply conduit propelling liquid from the source as pressurized liquid into the supply end of the delivery conduit;
   e. and a sheet receiving reservoir underlying the entire periphery of the down curving bell-shaped liquid sheet, the pressurized liquid passing through the delivery conduit is given laminar flow characteristics including smooth parallel uninflected streamlines, with equal pressures and equal particle velocities at laterally contiguous points of adjacent streamlines, which are all radially diverted symmetrically about said vertical axis by the deflector to produce a smooth thin uniform edgewise advancing unitary, continuous liquid sheet, providing optimum exposure of liquid sheet surface to the surrounding ambient atmosphere for a given volume of liquid delivered through the down curving bell-shaped liquid sheet to the reservoir.

2. The apparatus defined in claim 1 wherein the horn-shaped deflector has a generatrix curve initially parallel to the vertical axis and the streamlines of the advancing liquid stream issuing through the flow straightening screens.

3. The combination defined in claim 1, in further combination with supporting means anchoring the liquid delivery conduit coaxially in an exhaust gas stack, and the sheet receiving reservoir comprising a liquid recovery through anchored to the interior wall of the stack in a position to receive the edgewise advancing liquid sheet delivered by the liquid conduit and deflector, and is provided with a drain conduit for removing collected liquid and stack gas solids, dust, gases and liquids contained and absorbed therein.

4. The apparatus defined in claim 1 wherein the sheet receiving reservoir comprises a water supply reservoir and wherein the liquid delivery conduit delivers the bell-shaped sheet of water above the reservoir's free surface for aeration in the ambient atmosphere.

5. The apparatus defined in claim 1 in further combination with a chlorine gas supply source positioned to deliver chlorine gas to the ambient atmosphere to which the bell-shaped water sheet is exposed.

6. The combination defined in claim 2 wherein the deflector terminates in a downstream edge rim wider in diameter than the internal diameter of the liquid delivery conduit portal end.

7. The combination defined in claim 1 wherein six transverse flow straightening screens are employed.

8. The combination defined in claim 1 wherein the liquid delivery conduit is circular in cross section and is provided with a central coaxial pressurized gas supply conduit on which the deflector is anchored whereby the inner side of said liquid sheet may be pressurized and expanded in a bubblelike manner to enhance the mixing of said liquid with the gases in said surrounding environment.

9. The combination defined in claim 4, further including ozone generator means positioned between the liquid delivery conduit and the water reservoi's free surface.

10. The apparatus defined in claim 4 further including a float resting on the free surface of the water supply reservoir supporting the pump, the delivery conduit and the deflector in operative juxtaposition with said free surface.

11. The apparatus defined in claim 4 in further combination with an irradiating source positioned to project radiant energy upon the bell-shaped water sheet.

12. The apparatus defined in claim 4 in further combination with an ozone supply source positioned to deliver ozone gas to the ambient atmosphere to which the bell-shaped water sheet is exposed.